(12) United States Patent
Du et al.

(10) Patent No.: US 8,788,965 B2
(45) Date of Patent: Jul. 22, 2014

(54) METHOD AND DEVICE FOR DISPLAYING DATA BY ADJUSTING THE SIZE OF CONTROLS

(71) Applicant: Tencent Technology (Shenzhen) Company Limited, Guangdong (CN)

(72) Inventors: Xiuxing Du, Guangdong (CN); Bin Li, Guangdong (CN); Chungpeng Wang, Guangdong (CN); Xinqiu Xie, Guangdong (CN); Wei Zhou, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 13/739,611

(22) Filed: Jan. 11, 2013

(65) Prior Publication Data

US 2013/0132893 A1 May 23, 2013

Related U.S. Application Data

(63) Continuation of application No. PCT/CN2011/080322, filed on Sep. 28, 2011.

(30) Foreign Application Priority Data

Sep. 29, 2010 (CN) .......................... 2010 1 0500402

(51) Int. Cl.
*G06F 3/0485* (2013.01)
(52) U.S. Cl.
USPC .......................................... 715/786; 715/784
(58) Field of Classification Search
USPC .......................................... 715/786
See application file for complete search history.

(56) References Cited

U.S. PATENT DOCUMENTS

2007/0157112 A1 7/2007 Peters
2008/0178116 A1 7/2008 Kim

FOREIGN PATENT DOCUMENTS

| CN | 101082865 A | 12/2007 |
| CN | 101470567 A | 7/2009 |
| CN | 101770519 A | 7/2010 |

OTHER PUBLICATIONS

International Search Report: mailed Dec. 15, 2011; PCT/CN2011/080322.
Search Report from 2nd Chinese Office Action dated Jan. 6, 2014; Appln. No. 201010500402X.

*Primary Examiner* — Alvin Tan
(74) *Attorney, Agent, or Firm* — Harness, Dickey & Pierce, P.L.C.

(57) ABSTRACT

The embodiments of the present invention disclose a method and apparatus for displaying data, which relate to computer technologies. The method includes: determining a location where a scroll box is located; updating a data block displayed on at least one control through moving data blocks according to the location where the scroll box is located; and for each of the at least one control, adjusting the size of the control according to the size of the data block displayed on the control. Through adjusting the size of the control according to the size of the data blocks, the number of the control is adjusted, thus resources can be saved and calculation efforts can be reduced. In addition, since the height of the control is adjusted according to the size of the data block, diversified data services can be supported so as to meet the requirements of practical services.

10 Claims, 6 Drawing Sheets

METHOD AND DEVICE FOR DISPLAYING DATA BY ADJUSTING THE SIZE OF CONTROLS

FIELD OF THE INVENTION

The present invention relates to computer technologies, and more particularly to a method and apparatus for displaying data.

BACKGROUND OF THE INVENTION

With the rapid development of Internet, various applications related to Internet appear increasingly. Especially, with the rapid development of mobile Internet, the uploading and downloading of information present diversification day by day. More and more users can obtain Internet information resources through computers. Moreover, the appearance of various potable devices such as mobile terminals and netbooks makes it possible for users to obtain information whenever and wherever. More and more information can be obtained through Internet, but software designers face a challenge to how to display a large amount of data.

In a first conventional technology for displaying data, each data block is displayed through one separate control, and controls for displaying data are inserted into a container in a designated order. The more messages are, the larger the range of the container is. In a second conventional technology, when a large amount of data is to be displayed, limited list controls are provided, and to-be-displayed data blocks are drawn on the limited controls with equal heights.

In the procedure of implementing the present invention, the inventor finds that there are at least following disadvantages in the conventional technologies.

In the first conventional technology, since each data block is displayed through one separate control, a large number of controls need to be cached, and thus memory overhead is increased. Moreover, since the number of the controls for interface displaying is limited, the first conventional technology will waste resources. For the list controls provided by the second conventional technology, it is needed to preset the height of the list controls, and the heights of all the list controls should be kept up with each other, which will limit the display space of each of the list controls, and thus the second conventional technology fails to satisfy the requirements of practical services.

SUMMARY OF THE INVENTION

In order to decrease overhead, save resources and satisfy the requirements of practical services, embodiments of the present invention provide a method and apparatus for displaying data. The technical solutions are as follows.

In one aspect, a method for displaying data is provided, the method includes:

determining a location in a display interface where a scroll box is located;

updating a data block displayed on at least one control in the display interface through moving data blocks according to the location in the display interface where the scroll box is located; and for each of the at least one control, adjusting the size of the control according to the size of the data block displayed on the control.

In another aspect, an apparatus for displaying data is further provided, the apparatus includes:

a first determining module, configured to determine a location in a display interface where a scroll box is located; and a first displaying module, configured to update a data block displayed on at least one control in the display interface through moving data blocks according to the location in the display interface where the scroll box is located, and for each of the at least one control, adjust the size of the control according to the size of the data block displayed on the control.

The technical solutions provided by the embodiments of the present invention can achieve following advantages:

Through adjusting the size of the control according to the size of the data blocks, the number of the control is adjusted, thus resources can be saved. Moreover, since the number of the controls is limited, not only overhead can be decreased, but also calculation efforts can be reduced when the size of the display interface changes. In addition, the height of the control is adjusted according to the size of the data block drawn on the control, therefore, diversified data services can be supported so as to meet the requirements of the practical services.

BRIEF DESCRIPTION OF THE DRAWINGS

In order to clearly illustrate the technical solution provided by the embodiments of the present invention, the accompanying drawings used in the embodiments will be illustrated briefly. Obviously, the accompanying drawings are only some examples of the present invention, and those skilled in the art can obtain other accompanying drawings according to these accompanying drawings without inventive labors.

DETAILED DESCRIPTION OF THE INVENTION

In order to make objects, technical solutions and merits of the present invention clearer, the embodiments of the present invention will be illustrated in detail hereinafter with reference to the accompanying drawings.

Embodiment I

Figure 1:
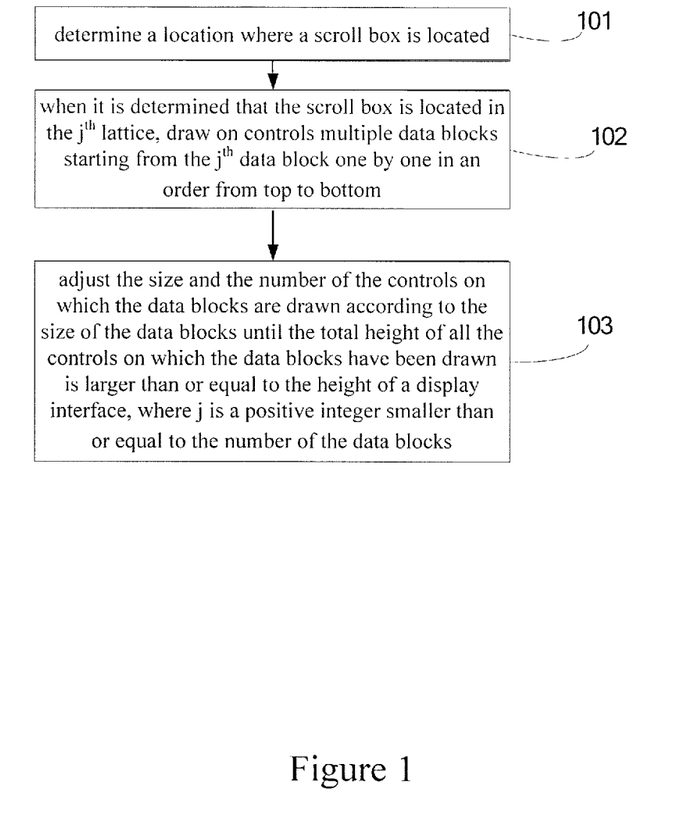
FIG. 1 is a flowchart illustrating a method for displaying data according to an embodiment of the present invention.

Referring to FIG. 1, this embodiment provides a method for displaying data which includes following specific processes.

In Block 101, a location where a scroll box is located is determined.

In Block 102, when it is determined that the scroll box is located in the j$^{th}$ lattice, multiple data blocks starting from the j$^{th}$ data block are drawn on controls one by one in an order from top to bottom.

In Block 103, the size and the number of the controls on which the data blocks are drawn is adjusted according to the size of the data blocks until the total height of all the controls on which the data blocks have been drawn is larger than or equal to the height of a display interface, where j is a positive integer smaller than or equal to the number of the data blocks.

In the method provided by this embodiment, through adjusting the size and the number of the controls on which the data blocks have been drawn according to the size of the data blocks to make the total height of all the controls on which the data blocks have been drawn be larger than or equal to the height of the display interface, resources can be saved. Moreover, since the number of the controls is limited, overhead can be decreased. In addition, since the height of the control is adjusted according to the size of the data block, diversified data services can be supported so as to meet the requirements of the practical services.

Embodiment II

Figure 2:
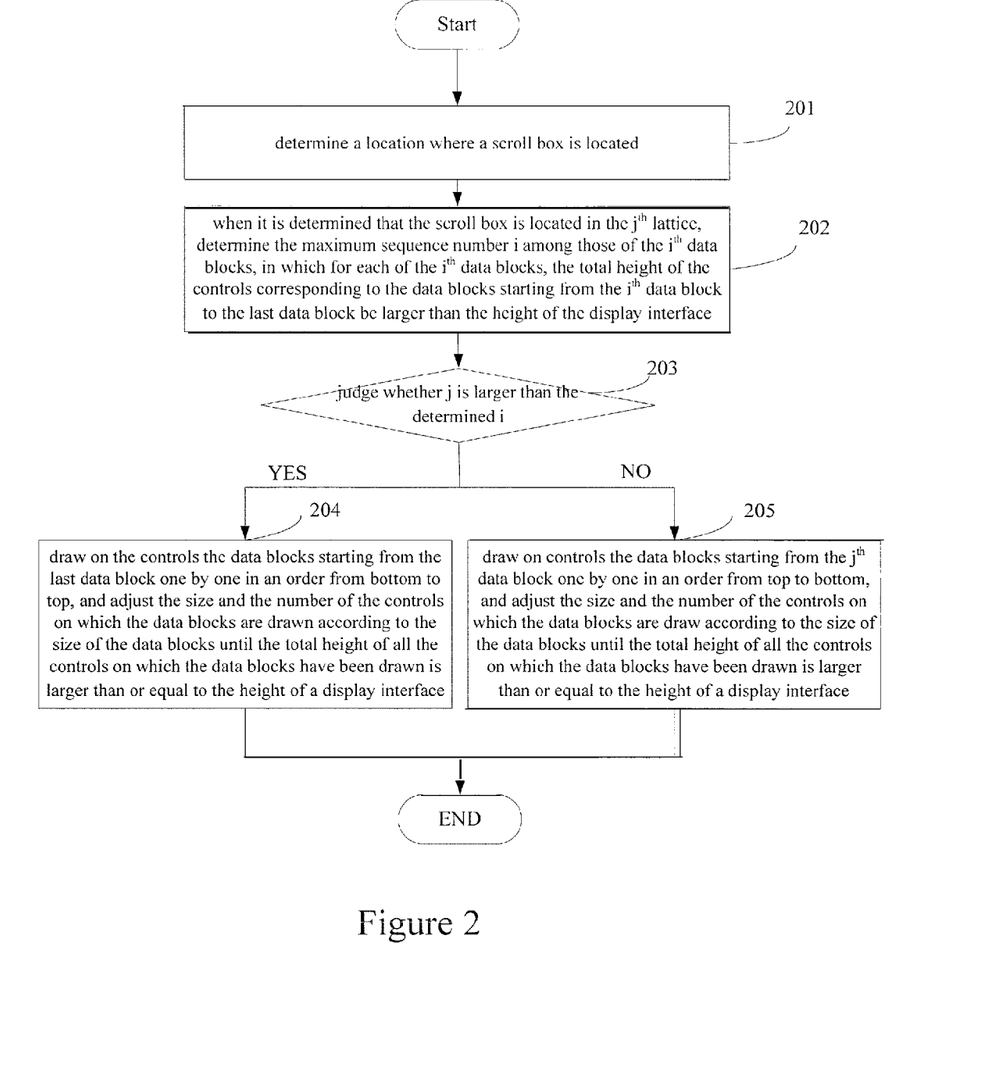
FIG. 2 is a flowchart illustrating a method for displaying data according to an embodiment of the present invention.

This embodiment provides a method for displaying data. Through creating a limited number of controls and adjusting the size of the controls according to the size of the data blocks when the data blocks are displayed, resources can be saved, overhead can be decreased and the requirements of the practical services can be satisfied. The method is especially applicable to an application scenario in which a large amount of data is to be displayed. For the convenience of description, this embodiment is illustrated by taking an example where a scroll bar is occurred when data is displayed. Referring to FIG. 2, the method provided by this embodiment includes following specific processes.

In Block 201, a location where a scroll box is located is determined.

In this block, when determining the location where the scroll box is located, a scrolled step size is determined through checking a scrolling operation, so as to determine the location where the scroll box should be located after the scrolling operation according to the previous location where the scroll box is located. The location where the scroll box should be located may be determined through other methods, which is not limited in this embodiment.

Figure 3:
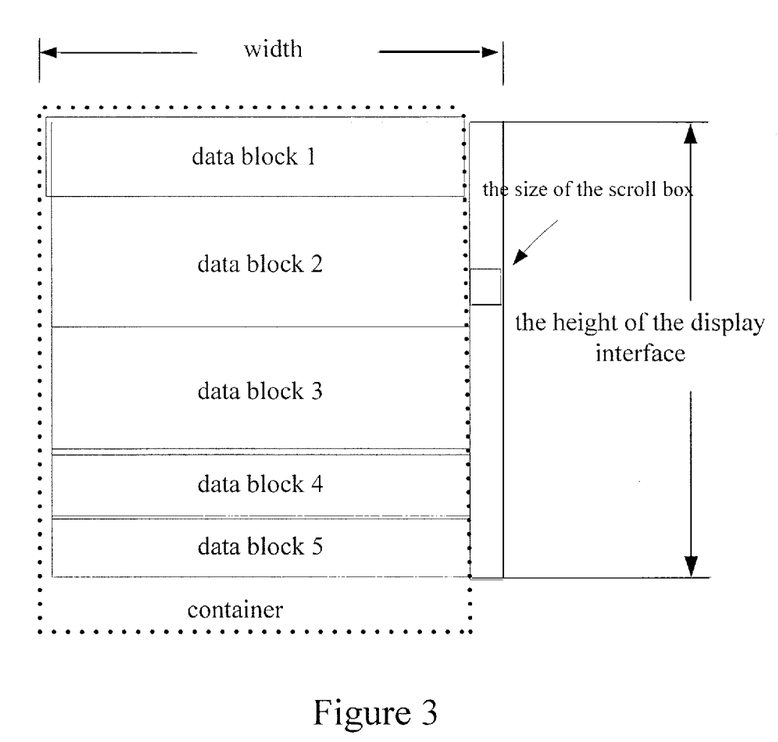
FIG. 3 is a schematic diagram illustrating data display according to an embodiment of the present invention.

The height of the scroll box is related to the number of the data blocks displayed. Referring to the schematic diagram of data display shown in FIG. 3, a relationship among the height of the scroll box, the length of the scroll bar, the size of the display interface and the range of the data blocks is represented by the following formula:

$$\frac{\text{the height of the scroll box}}{\text{the length of the scroll bar}} \approx \frac{\text{the size of the display interface}}{\text{the range of all the data blocks}}$$

The height of the scroll box may be determined according to the size of the display interface and the size of the data blocks. Supposing that the numbers of the current data blocks are N (N≥1) which are denoted as 1, 2, 3, . . . , N from top to bottom, the width and the height of the display interface at the current client is obtained as Xwidth and Yheight respectively, it is to determine the minimum i(1≤i≤N) among those of the data blocks which can make the total height of the controls corresponding to the i$^{th}$, (i+1)$^{th}$, (i+2)$^{th}$, . . . , n$^{th}$ data blocks be smaller than Yheight, and then the scroll bar is divided into lattices so that the height of the scroll box is Yheight/i.

For example, the height of the display interface, Yheigh, is 100 pixels, the total number of the data blocks is 100, the size of the 100$^{th}$ data block is 50 pixels, the size of the 99$^{th}$ data block is 20 pixels, the size of the 98$^{th}$ data block is 10 pixels, and the size of the 97$^{th}$ data block is 30 pixels. Computing from the 100$^{th}$ data block, as 50+20+10<100 and 50+20+10+30>100, the total height of the controls corresponding to the data blocks from the 98$^{th}$ data block to the last data block is smaller than the height of the display interface. Because of 98<99<100, i is determined as 98, the scroll bar is divided into 98 lattices, and the height of the scroll box is 100/98. When the scroll box moves to the 98$^{th}$ lattice, the data blocks from the 98$^{th}$ data block to the 100$^{th}$ data block all can be displayed within the display interface.

In addition, because the number of the controls created by the method provided in this embodiment is limited, i.e., only the minimum number of controls that can fill the display interface are created, the scrolling of the scroll box is not to move a view but to move the data blocks, the relative locations of controls are unchanged, but the data blocks displayed on the controls are updated. Therefore, when the to-be-displayed data are cached in a memory and fast indexing is performed according to a key, if the k$^{th}$ data block in an index is displayed on the top of the current display interface, the scroll box should be moved to the k$^{th}$ lattice, where k is a positive integer smaller than or equal to the number of the data blocks.

In the prior art, from the aspect of the display interface, if the total height of all the controls in the container is 600 pixels during data displaying and the scrolling step size of the scroll box is 20 pixels, then for the scroll box, moving one lattice is equivalent to moving 20 pixels which may be equal to the height of half a control, or may be equal to the height of one control. However, with regard to the method for displaying data provided by this embodiment, the scrolling step size of the scroll box is set as 1, and the scroll box moving one lattice or a trolley moving one lattice is equivalent to the scroll box moving the height of one control. The number of actually moved pixels depends on the size of the related data blocks. If the scroll bar is evenly divided into M lattices (M is a positive integer smaller than or equal to the number of the data blocks), and the scroll bar is located in the i$^{th}$ lattice before a user triggers a scrolling operation, then, the interface displays the data blocks starting from the i$^{th}$ data block in the current data queue. If the user moves one lattice downward, i.e., moves to the (i+1)$^{th}$ lattice, and then the control at the top of the display interface displays the (i+1)$^{th}$ data block.

In Block 202, when determining that the scroll box is located in the j$^{th}$ lattice, it is to determine the maximum sequence number i among those of the i$^{th}$ data blocks, in which for each of the i$^{th}$ data blocks, the total height of the controls corresponding to the data blocks from the i$^{th}$ data block to the last data block be larger than the height of the display interface.

Specifically, this embodiment does not limit the specific number of the created limited controls, as long as the created controls can fill the display interface after being drawn with the data blocks. Similarly, this embodiment does not limit the method of determining the number of the controls. In practical applications, the number of the controls may be determined according to the height of the display interface and the preset initial height of the controls. The preset initial height of the controls may be taken as the minimum height of the controls which is set by the user according to practical situations. The minimum height of the controls takes the pixel as a unit and is denoted as ItemHeightmin. The minimum height of the controls may also be a default height which is denoted as ItemHeightdef. If the height of the display interface is CYSCREEN, then the maximum number of the controls which can be displayed on the display interface which is denoted as ItemNum is:

$$\text{ItemNum} = [CY_{SCREEN}/\min\{\text{ItemHeight}_{min}, \text{ItemHeight}_{def}\}].$$

In an example where the height of the display interface is 2000 pixels, if the minimum height of the controls which is set by the user and the default minimum height are 100 pixels, the determined number of the controls is 2000/100=20, that is to say, the display interface displays 20 controls at most.

It is to determine the maximum sequence number i among those of the $i^{th}$ data blocks, in which the total height of the controls corresponding to the data blocks from the $i^{th}$ data block to the last one be larger than the height of the display interface. Supposing that the number of the current data blocks is N (N≥1) which are marked as 1, 2, 3, . . . , N from top to bottom, and the range of the display interface at the current client is obtained, e.g., the width of the display interface is Xwidth and the height of the display interface is Yheight, it is to determine the maximum i(1≤i≤N) among those of the data blocks which can make the total height of the controls corresponding to the data blocks from the $i^{th}$ one; the $(i+1)^{th}$ one, the $(i+2)^{th}$ one, . . . , to the $n^{th}$ one be larger than Yheight.

For example, the height of display interface which is denoted as Yheight is 100 pixels, the total number of the data blocks is 100, the size of the $100^{th}$ data block is 50 pixels, the size of the $99^{th}$ data block is 20 pixels, the size of the $98^{th}$ data block is 10 pixels, and the size of the $97^{th}$ data block is 30 pixels. Because 50+20+10+30>100, the total height of the controls corresponding to the data blocks from the $97^{th}$ one to the $100^{th}$ one is larger than the height of the display interface. That is to say, the total height of the controls corresponding to the data blocks from the one the sequence number of which is smaller than 97 to the last one is larger than the height of the display interface while as to the data block the sequence number of which is larger than 97, the total height of the controls corresponding to those from this data block to the last data block fails to satisfy the condition of being larger than the height of the display interface. Therefore, it is determined that i is equal to 97.

In Block 203, it is judged whether j is larger than i; if it is determined that j is larger than i, Block 204 is performed; and otherwise, Block 205 is performed.

In this block, judging whether j is larger than i is to determine the order of drawing the data blocks which will be illustrated in detail in subsequent blocks, where j and i are both positive integers smaller than or equal to the number of the data blocks.

In Block 204, starting from the last data block among multiple data blocks, the data blocks are drawn on the controls one by one in an order from bottom to top, and the size and the number of the controls on which the data blocks are drawn are adjusted according to the size of the data blocks until the total height of the controls on which the data blocks have been drawn is larger than or equal to the height of the display interface. The flowchart is ended.

In this block, i is the maximum sequence number among those of the $i^{th}$ data blocks in which each of the $i^{th}$ data blocks can make the total height of the controls corresponding to the data blocks from the $i^{th}$ data block to the last one be larger than the height of the display interface. In this block, j is larger than the maximum sequence number i, which means that the $j^{th}$ data block is located after the $i^{th}$ data block, and the total height of the controls corresponding to the data blocks from the $j^{th}$ one to the last one is not larger than the height of the display interface. In order to fully utilize the display interface, in this block, the data blocks starting from the last one among the multiple data blocks are drawn on the controls one by one in an order from bottom to top. In view of the limited range of the display interface, in this block, the drawing of the data blocks is stopped when the total height of the controls on which the data blocks have been drawn is larger than or equal to the height of the display interface. It should be noted that, if it is the first time to draw the data blocks, no control has been created on the display interface, and then it is needed to insert one control into the container which the display interface belongs to every time one data block is drawn. The maximum number of the controls may be determined according to the method described in Block 202. When a control is inserted into the container, it is not needed to insert the control again when to display the data, however, it is just needed to draw the to-be-displayed data on the existing controls. That is to say, the controls on which the data is drawn for another time have been in the container which the display interface belongs to, and the number of the controls is limited, however, only some of the controls can be displayed on the display interface and the others are hidden. In this embodiment, since the total height of the controls on which the data blocks have been drawn is larger than or equal to the height of the display interface, the controls on which data blocks have been drawn can all be displayed on the display interface, and the size and the number of such controls changes along with the size of the data blocks.

For example, the height of the display interface is 100 pixels. If each data block is 10 pixels, it is only needed to draw the first ten data blocks on ten controls to display the first ten data blocks. If each data block is 20 pixels, the display interface can only display the first five data blocks, and five controls are needed and the size of each control is 20 pixels. Of course, the sizes of different data blocks may be different, and the above is only an example. The sizes of the data blocks are not limited in this embodiment.

In Block 205, the data blocks starting from the $j^{th}$ data block among the multiple data blocks are drawn on the controls one by one in an order from top to bottom, the size and the number of the controls on which the data blocks are drawn are adjusted according to the size of the data blocks until the total height of the controls on which the data blocks have been drawn is larger than or equal to the height of the display interface. The flowchart is ended.

In this block, the difference between the method for drawing the data blocks on the controls and that described in Block 204 lies in the order of drawing the data blocks. In block 204, the data blocks are drawn in an order starting from the last data block while in this block, the data blocks are drawn in an order starting from the $j^{th}$ data block among the multiple data blocks. The specific method of drawing one data block on one control will not be illustrated herein in detail.

Preferably, no matter whether the data blocks are drawn in the order described in Block 204 or in the order described in Block 205, as the sizes of the data blocks are different, the heights of the controls for displaying the data blocks (i.e., the controls on which the data blocks are drawn) are different, and therefore, every time the scroll box moves one lattice, the moving jumping range of the display interface is not always identical. In order to optimize user experiences, the display interface may be scrolled with a uniform velocity, or other methods may be adopted to make the display interface be changed smoothly so as to improve user experiences, which is not limited in this embodiment.

Further, the method provided by this embodiment also supports an application scenario of deleting or adding a data block. When a data block is added, the total number of the data blocks is changed, and thus, the height of the scroll box needs to be determined again. The specific determining method may be referred to Block 201. Since a data block is added, the storage sequence of the data blocks previously stored in the memory will be changed, that is, the sequence numbers of the data blocks need to be adjusted. For example, a data block is added before the $i^{th}$ data block, the sequence numbers of the $i^{th}$ data block and other data blocks after the $i^{th}$ data block should be increased by 1. Besides, if the scroll box is located in the location corresponding to the $j^{th}$ data block before the data block is added, when the data block is added and the data is displayed after the height of the scroll box is corrected, the scroll box whose height has been corrected is configured on the current location of the previous $j^{th}$ data block, i.e., the $j^{th}$ data block before the adjusting of the sequence numbers. The data blocks starting from the previous $j^{th}$ data block are drawn on the controls one by one in the order from top to bottom, and the size and the number of the controls on which the data blocks are drawn are adjusted according to the size of the data blocks until the total height of the controls on which the data blocks have been drawn is larger than or equal to the height of the display interface.

For example, before a data block is added, the scroll box is located in the $j^{th}$ lattice. If the data block is added before the $j^{th}$ data block, the sequence number of the previous $j^{th}$ data block should be adjusted into j+1, and the sequence numbers of the data blocks after the previous $j^{th}$ data block should be increased by 1 respectively. Since the number of the data blocks is changed, the height of the scroll box needs to be determined again. After the height of the scroll box is corrected, the scroll box with its height being corrected needs to be configured on the current location of the previous $j^{th}$ data block. That is to say, the scroll box with its height being corrected is configured on the $(j+1)^{th}$ lattice. In contrast, if the data block is added after the $j^{th}$ data block, the sequence number of the previous $j^{th}$ data block is maintained, and the scroll box with its height being corrected is still configured on the $j^{th}$ lattice.

For an application scenario of deleting a data block, as the number of the data blocks will also be changed, not only the storage sequence of the data blocks stored in the memory is to be considered, i.e., the sequence numbers of the data blocks are to be adjusted, but also whether the scroll box still exists after a data block is deleted is to be considered. If the scroll box does not exist, i.e., all the data blocks can be displayed on the display interface, all the data blocks starting from the first data block are drawn on the controls one by one in an order from top to bottom, and the size and the number of controls on which the data blocks are drawn are adjusted according to the size of the data blocks. If the scroll box still exists after a data block is deleted, it is needed to determine the maximum sequence number i among those of the $i^{th}$ data blocks, in which each of the $i^{th}$ data blocks can make the total height of the controls corresponding to the data blocks from the $i^{th}$ data block to the last data block be larger than the height of the display interface, and it is also determined whether j is larger than i. If j is larger than i, the scroll box is configured after the $i^{th}$ lattice. The data blocks starting from the last data block in the multiple data blocks are drawn on the controls one by one in an order from bottom to top, and the size and the number of the controls on which the data blocks are drawn are adjusted according to the size of the data blocks until the total height of the controls on which the data blocks has been drawn is larger than or equal to the height of the display interface. If j is not larger than i, the sequence numbers of the data blocks are adjusted, the height of the scroll box is determined again, the scroll box whose height has been corrected is configured on the current location of the previous $j^{th}$ data block. The data blocks starting from the previous $j^{th}$ data block are drawn on the controls one by one in an order from top to bottom, and the size and the number of the controls on which the data blocks are drawn are adjusted according to the size of the data blocks until the total height of the controls on which the data blocks has been drawn is larger than or equal to the height of the display interface.

In addition, the method provided by this embodiment also supports a sorting logic, i.e., the data displayed on the display interface can be self-defined, and the self-defined order of the data may be that of the data blocks in the memory which is set by the user according to a certain rule, and the display interface can be refreshed according to the method provided by this embodiment. If the user does not set the order of the data blocks, the order of drawing the data blocks may be taken as the default order of the data displaying, which is not limited by this embodiment.

The method provided by this embodiment also supports change of the size of the container. This embodiment does not limit a triggering condition for the change of the size of the container, e.g., dragging the size of a window and hiding the scroll box and etc. When the size of the container is changed, as the width of the controls for displaying data is identical to the width of the content area of the container, only arrangement of elements such as internal characters and so on and the height of the controls need to be recalculated. When the size of container is changed, the drawing should guarantee the current view being unchanged as much as possible.

In the method provided by this embodiment, through adjusting the size and the number of the controls according to the size of the data blocks, not only resources can be saved, but also calculation amount can be reduced. In addition, since the total height of the controls is adjusted according to the size of the data blocks, diversified data services can be supported so as to satisfy the requirements of practical services.

Embodiment III

Figure 4:
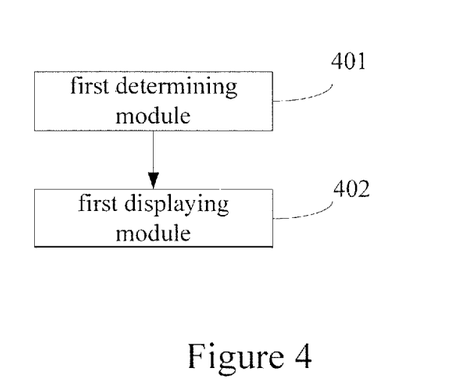
FIG. 4 is a schematic diagram illustrating a structure of a device for displaying data according to an embodiment of the present invention.

Referring to FIG. 4, this embodiment provides an apparatus for displaying data, including:

a first determining module 401, configured to determine location where a scroll box is located; and a first displaying module 402, configured to update a data block displayed on each of controls through moving data blocks according to the location where the scroll box is located, and for each of the controls, adjust the size of the control according to the size of the data block displayed on the control.

The apparatus further includes a creating module, configured to create a limited number of the controls which can fully fill a display interface.

The first displaying module 402 is configured to, when the first determining module 401 determines that the scroll box is located in the $j^{th}$ lattice, draw on the controls the data blocks starting from the $j^{th}$ data block among multiple data blocks one by one in an order from top to bottom, and adjust the size and the number of the controls on which the data blocks are drawn according to the size of the data blocks until the total height of the controls on which the data blocks have been drawn is larger than or equal to the height of a display interface, wherein j is a positive integer smaller than or equal to the number of the data blocks.

Figure 5:
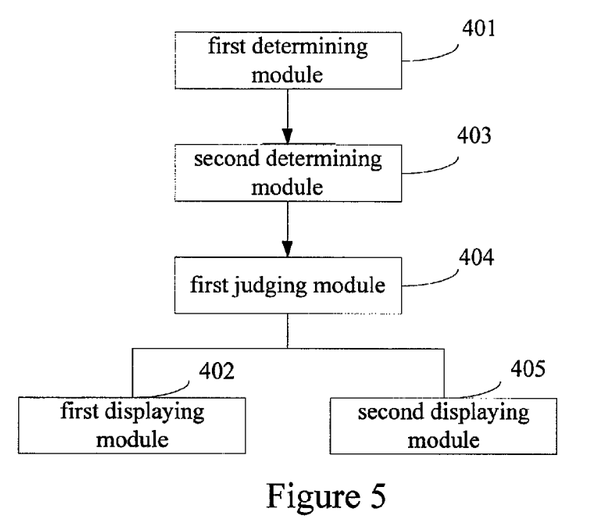
FIG. 5 is a schematic diagram illustrating a structure of a device for displaying data according to an embodiment of the present invention.

Additionally, referring to FIG. 5, the apparatus further includes:

a second determining module 403, configured to determine the maximum sequence number i among those of the $i^{th}$ data blocks, in which i is a positive integer smaller than or equal to the number of the data blocks, and for each of the $i^{th}$ data blocks, the total height of the controls corresponding to the data blocks from the $i^{th}$ data block to the last data block be larger than the height of the display interface;

a first judging module 404, configured to judge whether j is larger than the maximum sequence number i determined by the second determining module 403; and a second displaying module 405, configured to, when the first judging module 404 judges that j is larger than the maximum sequence number i determined by the second determining module 403, draw on the controls the data blocks starting from the last data block among the multiple data blocks one by one in an order from bottom to top, and adjust the size and the number of the controls on which the data blocks are drawn according to the size of the data blocks until the total height of the controls on which the data blocks have been drawn is larger than or equal to the height of the display interface; and otherwise, accordingly, the first displaying module 402 being configured to, when the first judging module 404 judges that j is not larger than the maximum sequence number i determined by the second determining module 403, draw on the controls the data blocks starting from the $j^{th}$ data block among multiple data blocks one by one in an order from top to bottom, and adjust the size and the number of the controls on which the data blocks are drawn according to the size of the data blocks until the total height of the controls on which the data blocks have been drawn is larger than or equal to the height of a display interface, wherein j is a positive integer smaller than or equal to the number of the data blocks.

Figure 6:
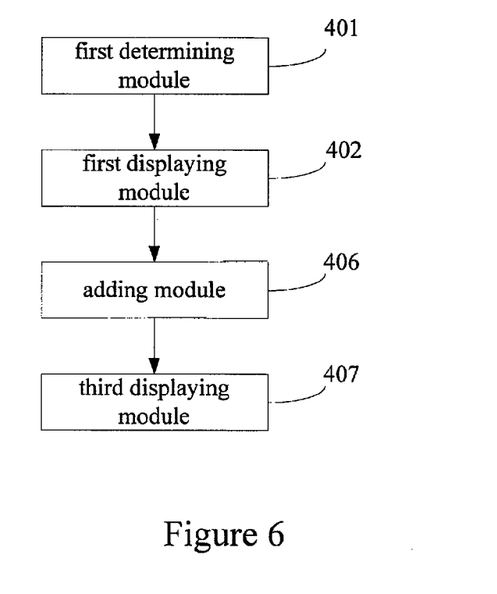
FIG. 6 is a schematic diagram illustrating a structure of a device for displaying data according to an embodiment of the present invention.

Optionally, referring to FIG. 6, the apparatus further includes:

an adding module 406, configured to add a data block into the multiple data blocks; and a third displaying module 407, configured to, after the adding module 406 adds a data block into the multiple data blocks, adjust the sequence numbers of the data blocks, and determine the height of the scroll box again; set the scroll box whose height has been corrected to the location where the previous $j^{th}$ data block is currently located; and draw on the controls the data blocks starting from the previous $j^{th}$ data block one by one in an order from top to bottom, and adjust the size and the number of the controls on which the data blocks are drawn according to the size of the data blocks until the total height of the controls on which the data blocks have been drawn is larger than or equal to the height of the display interface.

Figure 7:
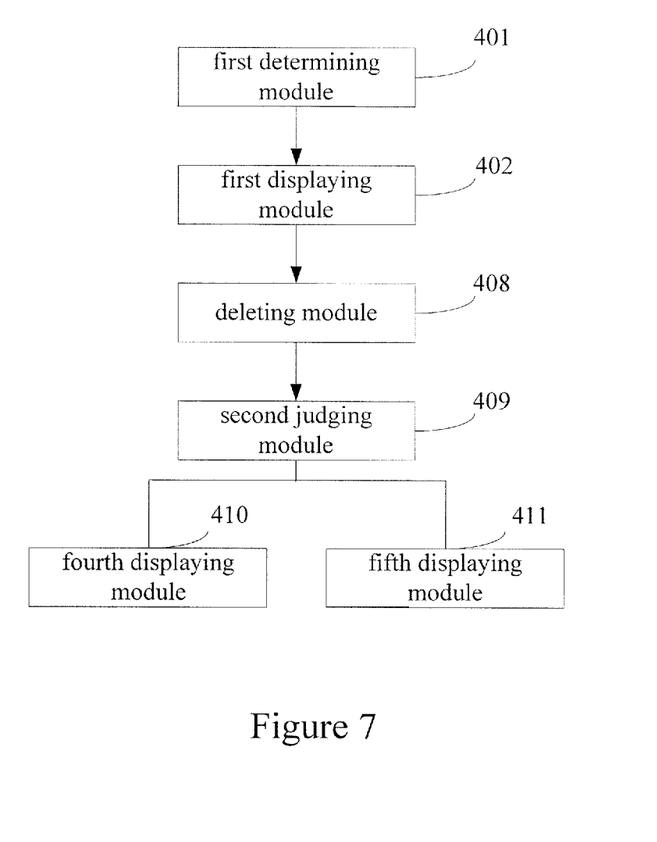
FIG. 7 is a schematic diagram illustrating a structure of a device for displaying data according to an embodiment of the present invention.

Optionally, referring to FIG. 7, the apparatus further includes:

a deleting module 408, configured to delete a data block from the multiple data blocks;

a second judging module 409, configured to, after the deleting module 408 deletes a data block from the multiple data blocks, judge whether the scroll box exists after a data block is deleted;

a fourth displaying module 410, configured to, when the second judging module 409 judges that the scroll box does not exist after the data block is deleted, draw on the controls the data blocks starting from the first data block one by one in an order from top to bottom, and adjust the size and the number of the controls on which the data blocks are drawn according to the size of the data blocks; and otherwise, a fifth displaying module 411, configured to, when the second judging module 409 judges that the scroll box exists after the data block is deleted, adjust the sequence numbers of the data blocks, determine the height of the scroll box again, set the scroll box whose height has been corrected to the location where the previous $j^{th}$ data block is currently located, draw on the controls the data blocks starting from the previous $j^{th}$ data block one by one in an order from top to bottom, and adjust the size and the number of the controls on which the data blocks are drawn according to the size of the data blocks until the total height of the controls on which the data blocks have been drawn is larger than or equal to the height of the display interface.

Figure 8:
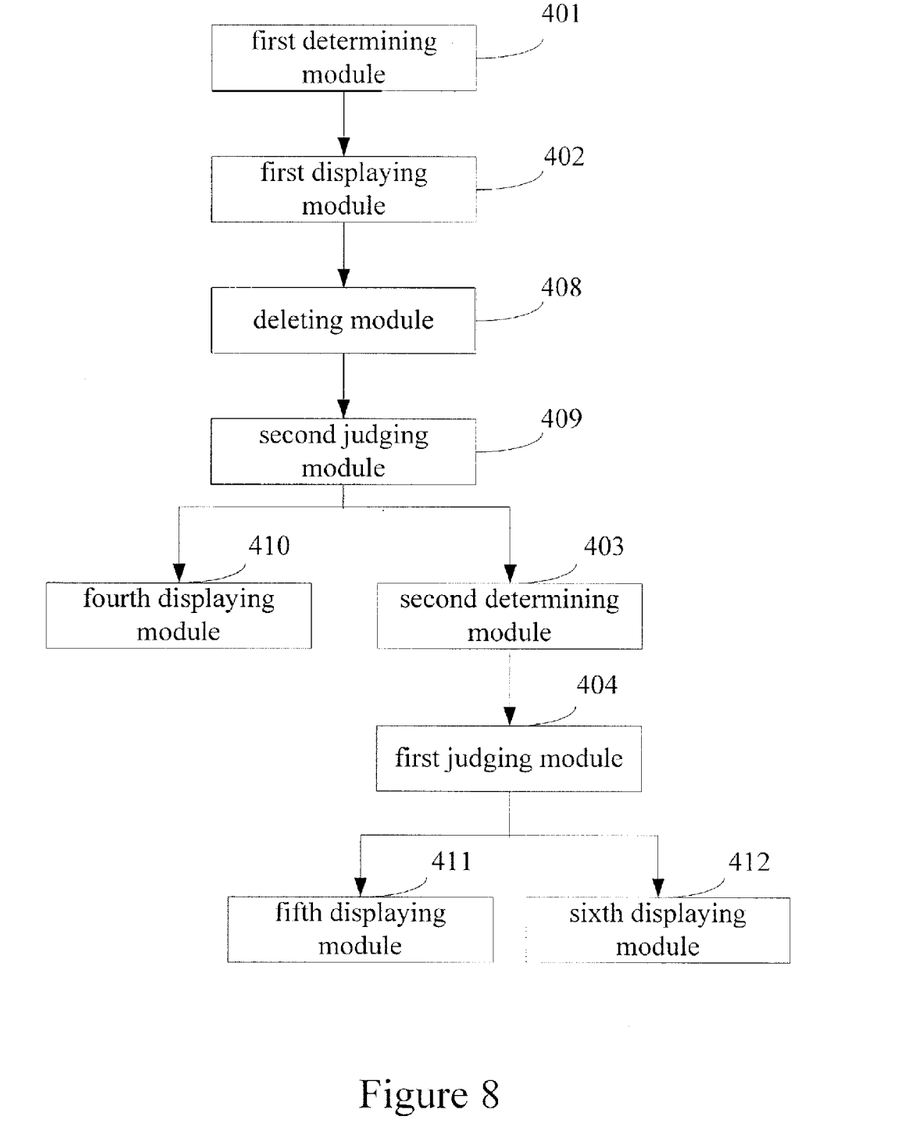
FIG. 8 is a schematic diagram illustrating a structure of a device for displaying data according to an embodiment of the present invention.

Additionally, referring FIG. 8, the apparatus further includes:

a second determining module 403, configured to determine the maximum sequence number i among those of the $i^{th}$ data blocks, in which i is a positive integer smaller than or equal to the number of the data blocks, and for each of the $i^{th}$ data blocks, the total height of the controls corresponding to the data blocks starting from the $i^{th}$ data block to the last data block be larger than the height of the display interface;

a first judging module 404, configured to judge whether j is larger than i which is determined by the second determining module 403;

a sixth displaying module 412, configured to, when the first judging module 404 judges that j is larger than i determined by the second determining module 403, draw on the controls the data blocks starting from the last data block one by one in an order from bottom to top, and adjust the size and the number of the controls on which the data blocks are drawn according to the size of the data blocks until the total height of the controls on which the data blocks have been drawn is larger than or equal to the height of the display interface; and otherwise, accordingly, the fifth displaying module 411 being configured to, when the first judging module 404 judges that j is not larger than i determined by the second determining module 403, adjust the sequence numbers of the data blocks, determine the height of the scroll box again, set the scroll box whose height has been corrected to the location where the previous $j^{th}$ data block is currently located, draw on the controls the data blocks starting from the previous $j^{th}$ data block one by one in an order from top to bottom, and adjust the size and the number of the controls on which the data blocks are drawn according to the size of the data blocks until the total height of the controls on which the data blocks have been drawn is larger than or equal to the height of the display interface.

To sum up, in the apparatus provided by this embodiment, through adjusting the size and the number of the controls on which the data blocks have been drawn according to the size of the data blocks to make the total height of the controls on which the data blocks have been drawn be larger than or equal to the height of the display interface, thereby, resources can be saved. Moreover, since the number of the controls is limited, calculation amount can be reduced when the size of the display interface is changed. In addition, since the total height of the controls is adjusted according to the size of the data blocks, diversified data services can be supported so as to meet the requirements of the practical services.

It should be noted that, when the apparatus provided by the above embodiment displays data, the apparatus is illustrated by taking the above division of function module as an example. In practical applications, the above functions may be implemented by different function modules according to requirements. That is to say, the apparatus may include different function modules to implement all or part of the above-described functions. In addition, the apparatus for displaying data provided by the above embodiment shares the same idea as the method for displaying data. The specific implementation of the apparatus may be referred to the embodiments of the method which will not be illustrated in detail herein.

The sequence numbers of the embodiments of the present invention are only used for description, but not used to represent the qualities of the embodiments.

All or part of the blocks in the embodiments of the present invention may be implemented with software. Corresponding software programs may be stored in a readable storage medium such as an Optical Disk (CD) or a hard disk or the like.

The foregoing is only preferred embodiments of the present invention and is not used to limit the protection scope of the present invention. Any modification, equivalent substitution and improvement without departing from the spirit and principle of the present invention are within the protection scope of the present invention.

What is claimed is:

1. A method for displaying data, comprising:
   determining a location in a display interface where a scroll box is located, the display interface having at least one control with each of the at least one control displaying a data block thereon;
   determining a height of the scroll box;
   updating a data block displayed on one of the at least one control in the display interface through movement of a first plurality of data blocks according to the location in the display interface where the scroll box is located; and
   for each of the at least one control, adjusting a size of the control according to a size of the data block displayed on the control, wherein the updating and the adjusting comprises:
      when determining that the scroll box is located in a jth lattice, performing Step A:
         drawing on each of the at least one control, a data block starting from a jth data block among a second plurality of data blocks to be displayed one by one in an order from top to bottom until a total height of all of the at least one control on which a data block has been drawn is larger than or equal to a height of the display interface, wherein
            when drawing one of the second plurality of data blocks on one of the at least one control, the size of the one control is further adjusted according to the size of the one data block; and
         wherein j is a positive integer smaller than or equal to the number of the second plurality of data blocks to be displayed.

2. The method of claim 1, before performing Step A, further comprising:
   determining a maximum sequence number i among those of ith data blocks, wherein i is a positive integer smaller than or equal to the number of the second plurality of data blocks, and for each of the ith data blocks, the total height of all of the at least one control corresponding to the second plurality of data blocks starting from the ith data block to a last data block among the second plurality of data blocks to be displayed be larger than the height of the display interface, and;
   judging whether j is larger than the determined maximum sequence number i;
   when it is judged that j is larger than the determined maximum sequence number i, drawing on each of the at least one control a data block starting from the last data block one by one in an order from bottom to top until a total height of all of the at least one control on which a data block has been drawn is larger than or equal to the height of the display interface, wherein when drawing one of the second plurality of data blocks on one of the at least one control, the size of the one control is further adjusted according to the size of the one data block; and otherwise,
   when it is judged that j is not larger than the determined maximum sequence number i, performing Step A.

3. The method of claim 1, after performing Step A, further comprising:
   adding a data block into the second plurality of data blocks to be displayed; and performing Step B:
   adjusting sequence numbers of the second plurality of data blocks, and determining the height of the scroll box again and correcting the height of the scroll box;
   setting the scroll box whose height has been corrected to a current location of the jth data block previously numbered; and
   drawing on each of the at least one control a data block starting from the jth data block previously numbered among the second plurality of data blocks one by one in an order from top to bottom until a total height of all of the at least one control on which a data block has been drawn is larger than or equal to a height of the display interface, wherein when drawing one of the second plurality of data blocks on one of the at least one control, the size of the one control is further adjusted according to the size of the one data block.

4. The method of claim 1, after performing Step A, further comprising:
   deleting a data block from the second plurality of data blocks to be displayed, and judging whether the scroll box exists after the data block is deleted;
   when it is judged that the scroll box does not exist, drawing on each of the at least one control a data block starting from a first data block among the second plurality of data blocks to be displayed one by one in an order from top to bottom, wherein when drawing one of the second plurality of data blocks on one of the at least one control, the size of the one control is further adjusted according to the size of the one data block; and otherwise,
   when it is judged that the scroll box exists, performing Step B: adjusting sequence numbers of the second plurality of data blocks, determining the height of the scroll box again and correcting the height of the scroll box, setting the scroll box whose height has been corrected to a current location of the jth data block previously numbered, drawing on each of the at least one control a data block starting from the jth data block previously numbered among the second plurality of data blocks one by one in an order from top to bottom until a total height of all of the at least one control on which a data block has been drawn is larger than or equal to the height of the display interface, wherein when drawing one of the second plurality of data blocks on one of the at least one control, the size of the one control is further adjusted according to the size of the one data block.

5. The method of claim 4, before performing Step B, further comprising:
   determining a maximum sequence number i among those of ith data blocks, wherein i is a positive integer smaller than or equal to the number of the second plurality of data blocks, and for each of the ith data blocks, the total height of all of the at least one control corresponding to the second plurality of data blocks starting from the ith data block to a last data block among the second plurality of data blocks to be displayed be larger than the height of the display interface, and
   judging whether j is larger than the determined maximum sequence number i;

when it is judged that j is larger than the determined maximum sequence number i, drawing on each of the at least one control a data block starting from the last data block among the second plurality of data blocks to be displayed one by one in an order from bottom to top until a total height of all of the at least one control on which a data block has been drawn is larger than or equal to the height of the display interface, wherein when drawing one of the second plurality of data blocks on one of the at least one control, the size of the one control is further adjusted according to the size of the one data block; and otherwise, when it is judged that j is not larger than the determined maximum sequence number i, performing Step B.

6. An apparatus for displaying data, comprising:
a non-transitory memory, configured to cache data blocks to be displayed;
a first determining module, configured to determine a location in a display interface where a scroll box is located and to determine a height of the scroll box, the display interface having at least one control with each of the at least one control displaying a data block thereon; and
a first displaying module, configured to update a data block displayed on one of the at least one control in the display interface through movement of a first plurality of data blocks according to the location in the display interface where the scroll box is located, and for each of the at least one control, adjust a size of the control according to a size of the data block displayed on the control, wherein
the first displaying module is configured to, when the first determining module determines that the scroll box is located in a jth lattice, draw on each of the at least one control a data block starting from a jth data block among a second plurality of data blocks to be displayed one by one in an order from top to bottom until a total height of all of the at least one control on which a data block has been drawn is larger than or equal to a height of the display interface, wherein when the first displaying module draws one of the second plurality of data blocks on one of the at least one control, the first displaying module further adjusts the size of the one control according to the size of the one data block.

7. The apparatus of claim 6, further comprising:
a second determining module, configured to determine a maximum sequence number i among those of ith data blocks, wherein i is a positive integer smaller than or equal to the number of the second plurality of data blocks, and for each of the ith data blocks, the total height of all of the at least one control corresponding to the second plurality of data blocks starting from the ith data block to a last data block among the second plurality of data blocks to be displayed be larger than the height of the display interface, wherein;
a first judging module, configured to judge whether j is larger than the maximum sequence number i determined by the second determining module; and
a second displaying module, configured to, when the first judging module judges that j is larger than the maximum sequence number i determined by the second determining module, draw on each of the at least one control a data block starting from the last data block among the second plurality of data blocks to be displayed one by one in an order from bottom to top until a total height of all of the at least one control on which a data block has been drawn is larger than or equal to the height of the display interface, wherein when the second displaying module draws one of the second plurality of data blocks on one of the at least one control, the second displaying module further adjusts the size of the one control according to the size of the one data block; and otherwise, the first displaying module being configured to, when the first judging module judges that j is not larger than the maximum sequence number i determined by the second determining module, draw on each of the at least one control a data block starting from the jth data block among the second plurality of data blocks to be displayed one by one in an order from top to bottom until a total height of all of the at least one control on which a data block has been drawn is larger than or equal to the height of the display interface, wherein when the first displaying module draws one of the second plurality of data blocks on one of the at least one control, the first displaying module further adjusts the size of the one control according to the size of the one data block.

8. The apparatus of claim 6, further comprising:
an adding module, configured to add a data block into the second plurality of data blocks to be displayed; and
a second displaying module, configured to, after the adding module adds the data block into the second plurality of data blocks to be displayed, adjust sequence numbers of the second plurality of data blocks, and determine the height of the scroll box again and correct the height of the scroll box; set the scroll box whose height has been corrected to a current location of the jth data block previously numbered; and draw on each of the at least one control a data block starting from the jth data block previously numbered among the second plurality of data blocks one by one in an order from top to bottom until a total height of all of the at least one control on which a data block has been drawn is larger than or equal to a height of the display interface, wherein when the second displaying module draws one of the second plurality of data blocks on one of the at least one control, the second displaying module further adjusts the size of the one control according to the size of the one data block.

9. The apparatus of claim 6, further comprising:
a deleting module, configured to delete a data block from the second plurality of data blocks to be displayed;
a first judging module, configured to, after the deleting module deletes the data block from the second plurality of data blocks to be displayed, judge whether the scroll box exists after the data block is deleted;
a second displaying module, configured to, when the first judging module judges that the scroll box does not exist after the data block has been deleted, draw on each of the at least one control a data block starting from a first data block among the second plurality of data blocks to be displayed one by one in an order from top to bottom, wherein when the second displaying module draws one of the second plurality of data blocks on one of the at least one control, the second displaying module further adjusts the size of the one control according to the size of the one data block; and otherwise,
a third displaying module, configured to, when the first judging module judges that the scroll box exists after the data block has been deleted, adjust sequence numbers of the second plurality of data blocks, determine the height of the scroll box again and correct the height of the scroll box, set the scroll box whose height has been corrected to a current location of the jth data block previously numbered, draw on each of the at least one control a data block starting from the jth data block previously numbered among the second plurality of data blocks one by one in an order from top to bottom until a total height of all of the at least one control on which a data block has been drawn is larger than or equal to the height of the display interface, wherein when the third displaying module draws one of the second plurality of data blocks on one of the at least one control, the third displaying module further adjusts the size of the one control according to the size of the one data block.

10. The apparatus of claim 9, further comprising:
a second determining module, configured to determine a maximum sequence number i among those of ith data blocks, in which i is a positive integer smaller than or equal to the number of the second plurality of data blocks, and for each of the ith data blocks, the total height of all of the at least one control corresponding to the second plurality of data blocks starting from the ith data block to a last data block among the second plurality of data blocks to be displayed be larger than the height of the display interface;
a second judging module, configured to judge whether j is larger than i determined by the second determining module; and
a fourth displaying module, configured to, when the second judging module judges that j is larger than i determined by the second determining module, draw on each of the at least one control a data block starting from the last data block among the second plurality of data blocks to be displayed one by one in an order from bottom to top until a total height of all of the at least one control on which a data block has been drawn is larger than or equal to the height of the display interface, wherein when the fourth displaying module draws one of the second plurality of data blocks on one of the at least one control, the fourth displaying module further adjusts the size of the one control according to the size of the one data block; and otherwise,
the third displaying module is configured to, when the second judging module judges that j is not larger than i determined by the second determining module, adjust the sequence numbers of the second plurality of data blocks, determine the height of the scroll box again and correct the height of the scroll box, set the scroll box whose height has been corrected to a current location of the jth data block previously numbered, draw on each of the at least one control a data block starting from the jth data block previously numbered among the second plurality of data blocks one by one in an order from top to bottom until the total height of all of the at least one control on which a data block has been drawn is larger than or equal to the height of the display interface, wherein when the third displaying module draws one of the second plurality of data blocks on one of the at least one control, the third displaying module further adjusts the size of the one control according to the size of the one data block.

* * * * *